United States Patent
Sampath et al.

(10) Patent No.: US 7,623,441 B1
(45) Date of Patent: Nov. 24, 2009

(54) SCALABLE SPACE-FREQUENCY CODING FOR MIMO SYSTEMS

(75) Inventors: Hemanth Sampath, Sunnyvale, CA (US); Ravi Narasimhan, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 871 days.

(21) Appl. No.: 10/767,067

(22) Filed: Jan. 28, 2004

Related U.S. Application Data

(60) Provisional application No. 60/494,204, filed on Aug. 11, 2003.

(51) Int. Cl.
*H04J 11/00* (2006.01)
(52) U.S. Cl. ............... 370/206; 370/211; 370/319; 370/334; 375/267; 375/299
(58) Field of Classification Search ............... 455/101, 455/103, 112; 375/299; 370/210, 208
See application file for complete search history.

(56) References Cited

U.S. PATENT DOCUMENTS

| | | | |
|---|---|---|---|
| 5,345,599 A | | 9/1994 | Paulraj et al. |
| 6,636,568 B2* | | 10/2003 | Kadous .................. 375/225 |
| 2002/0122383 A1* | | 9/2002 | Wu et al. .................. 370/210 |
| 2008/0267318 A1* | | 10/2008 | Ihm et al. .................. 375/299 |

OTHER PUBLICATIONS

Gesbert, et al. From Theory to Practice: An Overview of MIMO Space—Time Coded Wireless Systems, IEEE Journal on Selected Areas in Communications, vol. 21, No. 3, Apr. 2003.*
Rietz, College Algebra pp. 186-187, Henry Holt and Company, 1909.*
Foschini, et al., "On Limits of Wireless Communications in a Fading Environment when Using Multiple Antennas", Wireless Personal Communications, vol. 6, pp. 311-335, 1998.
S.M. Alamouti, "A Simple Transit Diversity Technique for Wireless Communications", IEEE Journal on Select Areas in Communications, vol. 16, No. 8, pp. 1451-1458, Oct. 1998.
Wolniansky, et al., "V-BLAST: An Architecture for Realizing Very High Data Rates Over the Rich-Scattering Wireless Channel", ISSSE 98. 1998 URSI International Symposium on Signals, Systems, and Electronics, pp. 295-300, Sep.-Oct. 1998.
Tarokh, et al., "Combined Array Processing and Space-Time Coding", IEEE Transactions on Information Theory, vol. 45, No. 4, pp. 1121-1128, May 1999.
Tarokh, et al., "Space-Time Block Codes from Orthogonal Designs", IEEE Transactions on Information Theory, vol. 45, No. 5, pp. 1456-1467, Jul. 1999.

(Continued)

*Primary Examiner*—Seema S Rao
*Assistant Examiner*—Henry Baron

(57) ABSTRACT

A transceiver in an N×N MIMO (Multiple-In-Multiple-Out) system includes a mode selection module to select a spatial multiplexing rate and a coding module to space frequency code OFDM (Orthogonal Frequency Division Multiplexing) symbols in response to the selected spatial multiplexing rate. The coding module maps data symbols to the transmit antennas for all data tones in the OFDM symbol. The tones may be mapped using different mapping permutations, which may be applied to the tones in a cyclical manner.

63 Claims, 6 Drawing Sheets

OTHER PUBLICATIONS

Sandhu, et al., "Space-Time Block Codes versus Space-Time Trellis Codes", IEEE Communications Letters, vol. XX, No. Y, pp. 1-11, Nov. 2000.

Hassibi, et al., "High-Rate Codes that are Linear in Space and Time", IEEE Transactions on Information Theory, vol. 48, No. 7, pp. 1-55, Jul. 2002.

Heath, et al., "Linear Dispersion Codes for MIMO Systems Based on Frame Theory", IEEE Transactions on Signal Processing, vol. 50, No. 10, pp. 2429-2441, Oct. 2002.

Ma, et al., "Full-Rate Full-Diversity Complex-Field Space-Time Codes for Frequency- or Time-Selective Fading Channels", Conference Record of the Thirty-Sixth Asilomar Conference on Signals, Systems and Computers, vol. 2, pp. 1714-1718, Nov. 2002.

Liu, et al., "Linear Constellation Precoding for OFDM With Maximum Multipath Diversity and Coding Gains", IEEE Transactions on Communications, vol. 51, No. 3, pp. 416-427, Mar. 2003.

Xin, et al., "Space-Time Diversity Systems Based on Linear Constellation Precoding", IEEE Transactions on Wireless Communications, vol. 2, No. 2, pp. 294-309, Mar. 2003.

Jung, et al., "Design of Concatenated Space-Time Block Codes Using Signal Space Diversity and the Alamouti Scheme", IEEE Communications Letters, vol. 7, No. 7, pp. 329-331, Jul. 2003.

Draft 802.20 Permanent Document; "System Requirements for IEEE 802.20 Mobile Broadband Wireless Access Systems—Version 14"; IEEE P 802.20 PD-06; Jul. 16, 2004.

"Part 16: Air Interface for Fixed Broadband Wireless Access Systems", IEEE Standard 802.16 (Oct. 2004); pp. 1-857.

"IEEE P802.11g/D8.2, Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band," IEEE P802.11g/D8.2, Apr. 2003, Supplement to ANSI/IEEE Std 802.11 1999(Reaff 2003), 69 pages.

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band," IEEE Std 802.11a-1999 (Supplement to IEEE Std 802.11-1999), Approved Sep. 16, 1999, 91 pages.

"802.16™, IEEE Standard for Local and metropolitan area networks, Part 16: Air Interface for Fixed Broadband Wireless Access Systems," IEEE Std 802.16-2001, Apr. 8, 2002, 349 pages.

* cited by examiner

Rate M = 4

Rate M = 3

Rate M = 2

Rate M = 1

SCALABLE SPACE-FREQUENCY CODING FOR MIMO SYSTEMS

CROSS-REFERENCE TO RELATED APPLICATIONS

This application claims priority to U.S. Provisional Application Ser. No. 60/494,204, filed on Aug. 11, 2003, which is hereby incorporated by reference in its entirety.

BACKGROUND

Wireless phones, laptops, PDAs, base stations and other systems may wirelessly transmit and receive data. A single-in-single-out (SISO) system may have two single-antenna transceivers in which one predominantly transmits and the other predominantly receives. The transceivers may use multiple data rates depending on channel quality.

An $M_R \times M_T$ multiple-in-multiple-out (MIMO) wireless system uses multiple transmit antennas ($M_T$) and multiple receive antennas ($M_R$) to improve data rates and link quality. The MIMO system may achieve high data rates by using a transmission signaling scheme called "spatial multiplexing," where a data bit stream is demultiplexed into parallel independent data streams. The independent data streams are sent on different transmit antennas to obtain an increase in data rate according to the number of transmit antennas used. Alternatively, the MIMO system may improve link quality by using a transmission signaling scheme called "transmit diversity," where the same data stream (i.e., same signal) is sent on multiple transmit antennas after appropriate coding. The receiver receives multiple copies of the coded signal and processes the copies to obtain an estimate of the received data.

The number of independent data streams transmitted is referred to as the "multiplexing order" or spatial multiplexing rate (M). A spatial multiplexing rate of M=1 indicates pure diversity and a spatial multiplexing rate of M=min ($M_R$, $M_T$) (minimum number of receive or transmit antennas) indicates pure multiplexing.

SUMMARY

A wireless system, e.g., a Multiple-In-Multiple-Out (MIMO)-Orthogonal Frequency Division Multiplexing (OFDM) system, may select a spatial multiplexing rate (M) from a number of available rates based on the channel conditions. The number of available mapping permutations for a given multiplexing rate may be given by $$\binom{M_T}{M} = \frac{M_T!}{M! \times (M_T - M)!},$$

wherein M is the spatial multiplexing rate and $M_T$ is the number of antennas. The available multiplexing rates may include pure diversity, pure multiplexing, and one or more intermediate spatial multiplexing rates.

A coding module in a transmitter in the system may space frequency code OFDM symbols for transmission. The coding module may include mapping one or more data symbols, depending on the spatial multiplexing rate, to a number of antennas. The coding module may map the appropriate number of symbols to the antennas using different mapping permutations for different tones in the symbol. The mapping permutations may be applied cyclically, and may be different for adjacent tones or applied to blocks of tones.

The space frequency coding may provide substantially maximum spatial diversity for the selected spatial multiplexing rate. Also, such coding may enable transmission at a substantially equal power on each of the antennas. The space frequency coded symbol may use less than all available tone-antenna combinations.

The wireless system may comply with one of the IEEE 802.11a, IEEE 802.11g, IEEE 802.16, and IEEE 802.20 standards.

DETAILED DESCRIPTION

Figure 1:
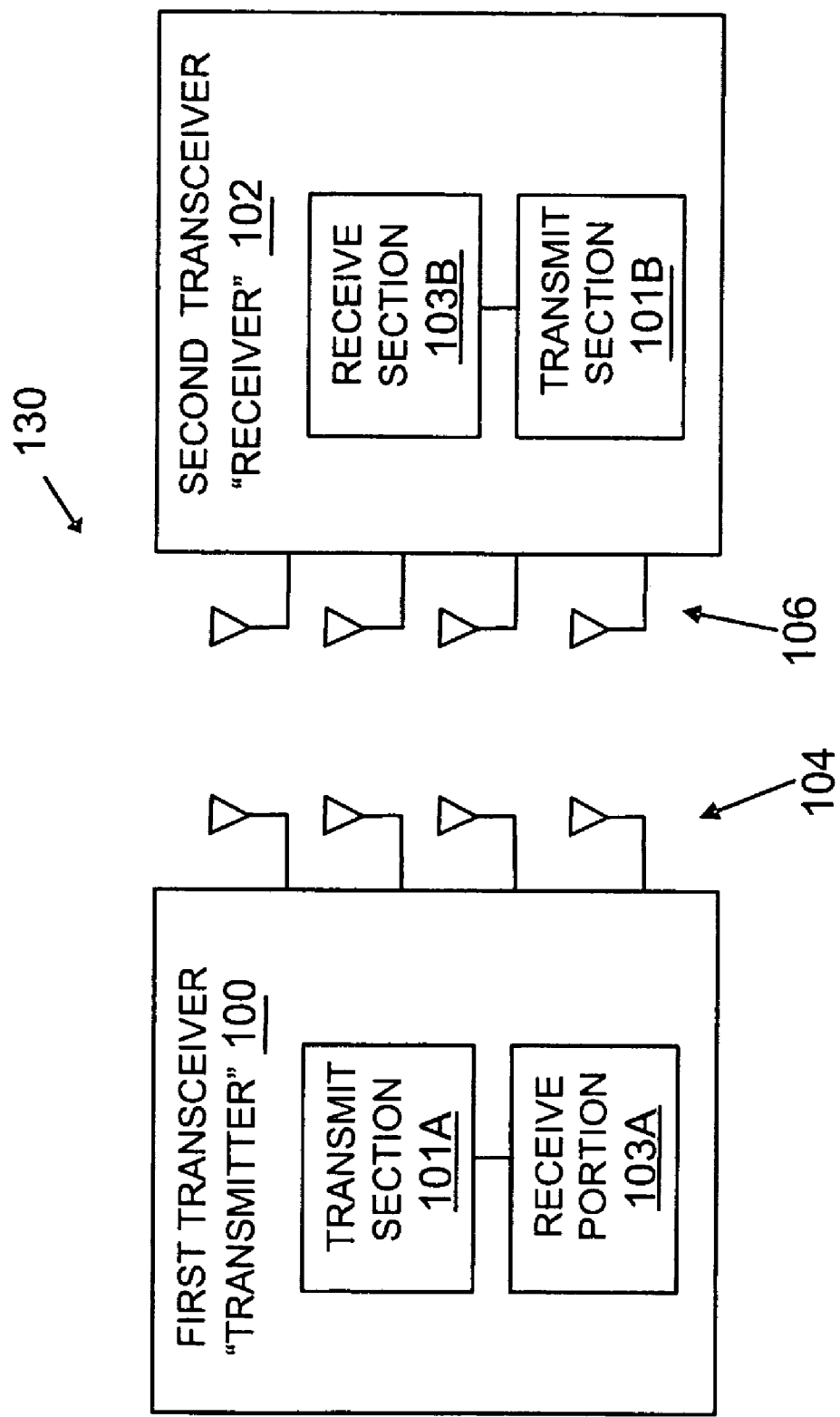
FIG. 1 is a block diagram of a wireless multiple-in-multiple-out (MIMO) communication system.

FIG. 1 illustrates a wireless multiple-in-multiple-out (MIMO) communication system 130, which includes a first transceiver 100 with multiple transmit antennas ($M_T$) 104 and a second transceiver 102 with multiple receive antennas ($M_R$) 106. In an embodiment, each transceiver has four antennas, forming a 4×4 MIMO system. For the description below, the first transceiver 100 is designated as a "transmitter" because the transceiver 100 predominantly transmits signals to the transceiver 102, which predominantly receives signals and is designated as a "receiver". Despite the designations, both "transmitter" 100 and "receiver" 102 may transmit and receive data, as shown by the transmit sections 101A, 101B and receive sections 103A, 103B in each transceiver.

The transmitter 100 and receiver 102 may be part of a MIMO-OFDM (Orthogonal Frequency Division Multiplexing) system. OFDM splits a data stream into multiple radiofrequency channels, which are each sent over a subcarrier frequency (also called a "tone").

The transmitter 100 and receiver 102 may be implemented in a wireless local Area Network (WLAN) that complies with the IEEE 802.11 family of specifications. It is also contemplated that such transceivers may be implemented in other types of wireless communication devices or systems, such as a mobile phone, laptop, personal digital assistant (PDA), a base station, a residence, an office, a wide area network (WAN), etc.

The number of independent data streams transmitted by the transmit antennas 104 is called the "multiplexing order" or "spatial multiplexing rate" (M). A spatial multiplexing rate of M=1 indicates pure diversity, and a spatial multiplexing rate of M=min($M_R$, $M_T$) (minimum number of receive or transmit antennas) indicates pure multiplexing.

Each data stream may have an independent coding rate (r) and a modulation order (d). The physical (PHY) layer, or raw, data rate may be expressed as R=r×$\log_2$(d)×M Bps/Hz. A transmitter's PHY layer chip may support many data rates depending on the values of M, r and d.

In an embodiment, the MIMO system 130 may use combinations of diversity and spatial multiplexing, i.e., $1 \leq M \leq \min(M_R, M_T)$. For example, in the 4×4 MIMO system described above, the system may select one of the four available multiplexing rate (M∈[1, 2, 3, 4]) depending on the channel conditions. The system may change the spatial multiplexing rate as channel conditions change.

In an embodiment, the MIMO system employs space-frequency coding. A space-frequency code can be used to transmit symbols for varying degrees of multiplexing and diversity orders. The OFDM tone will be denoted as "t", t∈[1, 2, ..., T], where T is the total number of data tones per OFDM symbol. For IEEE 802.11, the total number of tones is 64, out of which 48 tones are data tones (i.e., T=48). For each t∈[1, 2, ..., T], the space frequency code maps M symbols into $M_T$ transmit antennas.

Figure 2:
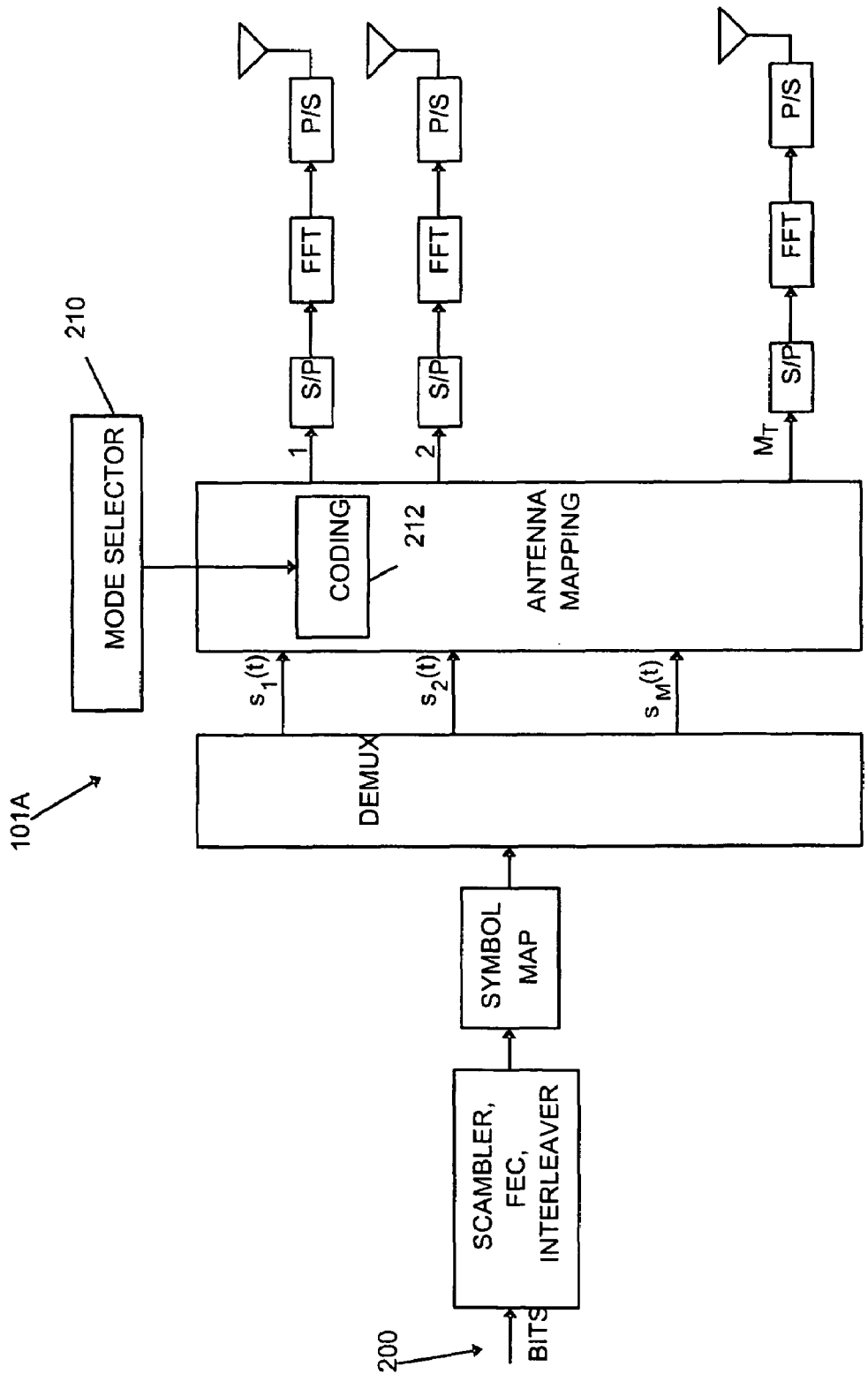
FIG. 2 is a block diagram of a transceiver transmit section for and space-frequency coding.

FIG. 2 shows one embodiment of a transceiver transmit section employing OFDM modulation and space-frequency coding. The input stream may be subject to scrambling, FEC (Forward Error Correction), interleaving, and symbol mapping to generate the symbols. Other encoding techniques may be used in lieu of those described above, as well. For each OFDM tone, t, an antenna mapping module 205 maps M symbol streams $s_1(t), s_2(t), \ldots, s_M(t)$ onto $M_T$ transmit antennas.

Figure 3:
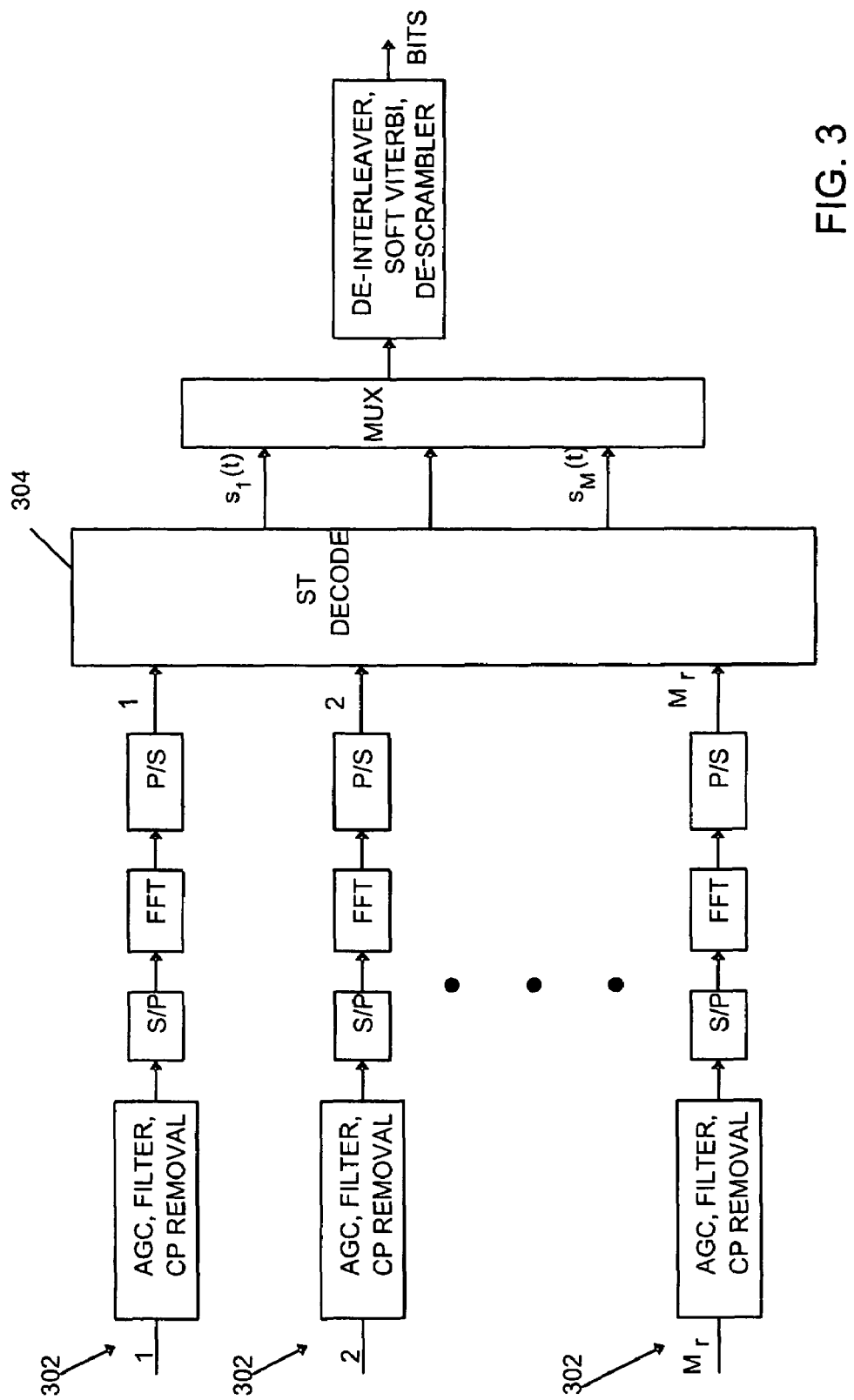
FIG. 3 is a block diagram of a transceiver receive section for space-frequency decoding.

FIG. 3 shows one embodiment of a transceiver receive section for decoding space-frequency coded signals. The received signals 302 on the $M_R$ receive antenna may be subject to AGC (Automatic Gain Control), filtering, CP (Cyclic Prefix) removal, and FFT (Fast Fourier Transform) processing to yield the received symbols across OFDM tones. The received symbols may be represented as $y_1(t), y_2(t), \ldots, y_M(t)$. A decoder 304 processes the received symbols using linear or non-linear space-frequency receivers to yield the estimates $\hat{s}_1(t), \hat{s}_2(t), \ldots, \hat{s}_M(t)$ ZF (Zero Forcing), MMSE (Minimum Mean Square Error) are examples of linear space-frequency detection schemes. BLAST (Bell Laboratories Layered Space-Time) and ML (Maximum Likelihood) are examples of non-linear space-frequency detection schemes.

In an embodiment, the transmit section includes a mode selector 210 and a coding module 212 (FIG. 2). The mode selector 210 determines an appropriate spatial multiplexing rate (M) for the current channel conditions. The coding module may employ a mode selection technique described in co-pending U.S. patent application Ser. No. 10/620,024, filed on Jul. 14, 2003 and entitled "DATA RATE ADAPTATION IN MULTIPLE-IN-MULTIPLE-OUT SYSTEMS", which is incorporated herein in its entirety. The coding module 212 constructs an appropriate space-frequency code for the selected spatial multiplexing rate.

Figure 4:
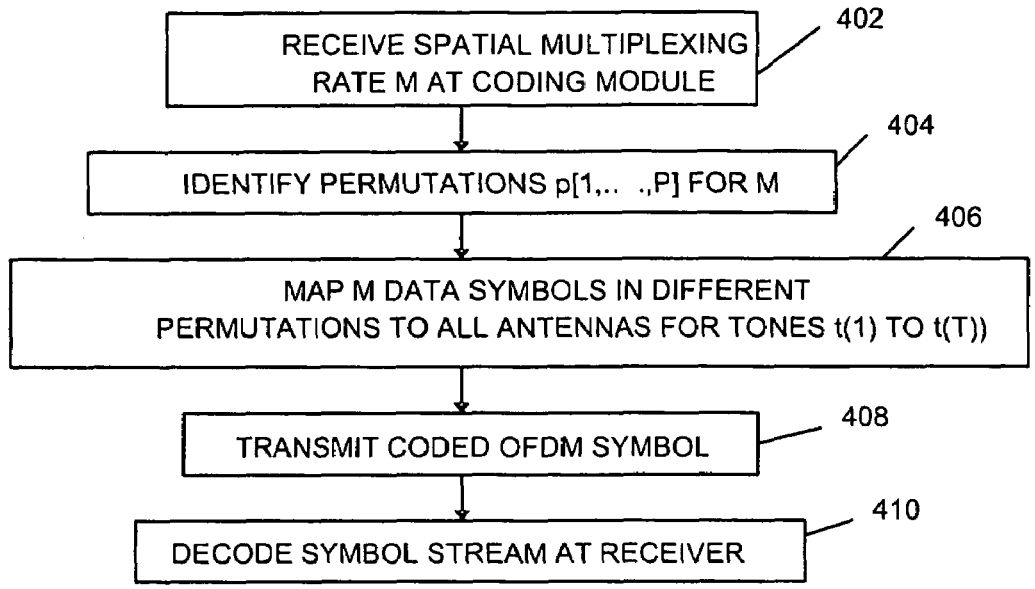
FIG. 4 is a flowchart describing an antenna mapping technique for multiple spatial multiplexing rates.
Figure 5:
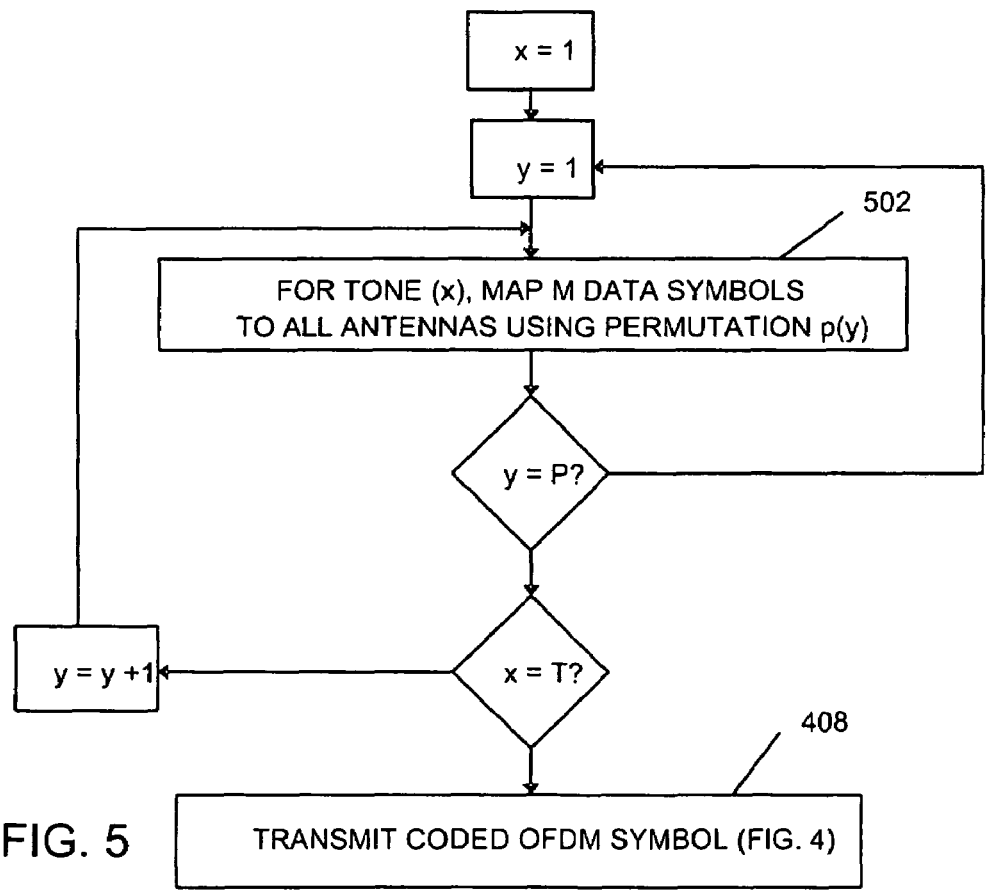
FIG. 5 is a flowchart describing an antenna mapping technique for multiple spatial multiplexing rates in which permutations are applied in a cyclical manner.

FIG. 4 is a flowchart describing an exemplary space-frequency code construction operation that may be performed by the coding module 212. The coding module 212 may receive the spatial multiplexing rate M from the mode selector 210 (block 402). The coding module 212 may then identify the permutations for the rate M (block 404). There are a total of $$\binom{M_T}{M} = \frac{M_T!}{M! \times (M_T - M)!} = P$$

permutations possible for a given spatial multiplexing rate M. The coding module 212 maps M data symbols to the $M_T$ antennas using the different permutations p[(1, ..., P] across the T tones of the OFDM symbol (block 406). In an embodiment, the permutations are applied in a cyclical manner, as described in FIG. 5. For example, if the number of possible permutations (P) for a given rate M is 4, then for tone t=1, M data symbols are mapped to the $M_T$ antennas using permutation p(1) and again for tones t=5, t=9, t=13, etc. (block 502). For tone t=2, M data symbols are mapped to the $M_T$ antennas using permutation p(2) and again for tones t=6, t=10, t=14, etc. When all tones are coded, the OFDM symbol may be transmitted (block 408) and then decoded at the receiver 102 (block 410).

The following example describes a space-frequency coding operation for a 4×4 MIMO OFDM system, for spatial multiplexing rates M=4, 3, 2, 1.

As shown in FIGS. 6A-6D, the "X"'s represent symbols 602 (for example $S_1(1)$ and so on). The x-axis indicates tone number, and the y-axis indicates the antenna number. The vertical line 604 indicates the period of repetition pattern or mapping of symbols across tones.

In the 4×4 MIMO system, the spatial frequency multiplexing rate of M=4 indicates pure multiplexing. The space frequency code at tone "t" is given as:

$$C(t) = \begin{bmatrix} s_1(t) \\ s_2(t) \\ s_3(t) \\ s_4(t) \end{bmatrix} \quad (1)$$

Figure 6A:
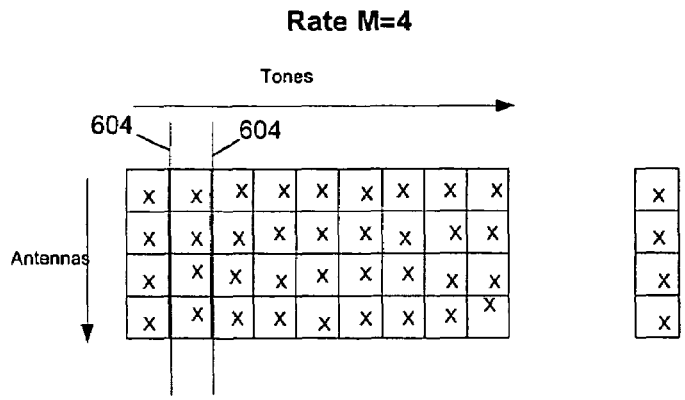
FIGS. 6A-6D are plots showing antenna mappings for different spatial multiplexing rates according to an embodiment.

In other words, at each tone, one independent symbol is sent on each antenna as shown in FIG. 6A for M=4. Here, there is only one permutation $$\left(\binom{4}{4} = \frac{4!}{4! \times (0)!} = 1\right).$$

The transmitted symbol is received at the receiver 102 and decoded by the decoding module 304. The received vector at OFDM tone t for decoding at the receiver may be represented by the following equation:

$$y(t) = H(t)c(t) + n(t) \quad (2)$$

where y(t) is an $M_R \times 1$ receive vector, $H(t) = [h_1(t) \ldots h_{M_T}(t)]$ is the $M_R \times M_T$ channel matrix at tone "t" and $h_j(t)$ is the $M_R \times 1$ channel vector, c(t) is the $M_T \times 1$ space-frequency code vector at tone t, and n(t) is the $M_R \times 1$ noise vector.

The channel matrix inverse at each tone, t, is given as:

$$G(t) = pinv[H(t)] = \begin{bmatrix} g_1(t) \\ g_2(t) \\ \ldots \\ g_{M_R}(t) \end{bmatrix} \quad (3)$$

This space-frequency code for M=4 may be decoded using either a linear processing scheme or a non-linear processing scheme.

For example, for a ZF (linear) receiver, the transmit symbol vector is given as:

$$\hat{C}(t) = \begin{bmatrix} \hat{s}_1(t) \\ \hat{s}_2(t) \\ \hat{s}_3(t) \\ \hat{s}_4(t) \end{bmatrix} = G(t) \cdot y(t) \quad (4)$$

The transmit symbols are obtained by slicing the symbols $\hat{s}_1(t), \ldots, \hat{s}_4(t)$ to the nearest constellation point, i.e., $s_j(t) = Q(\hat{s}_j(t))$, where Q denotes the slicing operation. The symbol streams benefit from a diversity order $D=(M_R-M_T+1)$.

Other linear receivers include the MMSE receiver, which also incorporates the noise variance in the formulation.

For a BLAST (non-linear) receiver, the receiver first decodes the symbol $s_k(t)=Q(\hat{s}_k(t))$, where $\hat{s}_k(t)$ is obtained from equation (4) and k=arg max $(\|g_i(t)\|^2)$, i∈[1, 2, 3, 4]. The contribution from the decoded symbol $\hat{s}_k(t)$ is then removed from the received vector y(t) to get a new system equation: $y'(t)=H'(t)+n'(t)$, where $H'(t) \leftarrow H(t)\langle_k$ and $y'(t) \leftarrow Y(t)-h_k(t)s_k(t)$. The decoding process is repeated until all symbols are decoded. The symbol decoded at the $n^{th}$ stage benefits from a diversity order of $D=(M_R-M_T+n)$.

Other non-linear receivers include the ML receiver. However, the implementation complexity may be high compared to the linear and BLAST receivers described above.

Figure 6B:
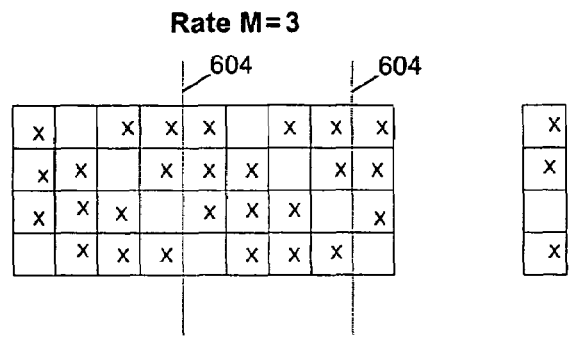

For a spatial multiplexing rate M=3, 3 symbols are mapped onto $M_T=4$ antennas at each OFDM tone, t. There are a total of $$\binom{4}{3} = \frac{4!}{3! \times (1)!} = 4$$

permutations possible. The mappings may be chosen in an cyclical fashion as follows, as shown in FIG. 6B for M=3:

For tone 1 (t=1):

$$C(1) = \begin{pmatrix} s_1(1) \\ s_2(1) \\ s_3(1) \\ 0 \end{pmatrix}$$

For tone 2 (t=2):

$$C(2) = \begin{pmatrix} 0 \\ s_2(2) \\ s_3(2) \\ s_4(2) \end{pmatrix}$$

For tone 3 or t=3:

$$C(3) = \begin{pmatrix} s_1(3) \\ 0 \\ s_3(3) \\ s_4(3) \end{pmatrix}$$

For tone 4 or t=4:

$$C(4) = \begin{pmatrix} s_1(4) \\ s_2(4) \\ 0 \\ s_4(4) \end{pmatrix}$$

and so on for higher tone numbers, in a cyclical fashion.

The receiver implementations are similar to that given above for the M=4 case. The only difference is that the $M_R \times 1$ column vector, $h_j(t)$, is set to zero. The column "j" corresponds to the antenna on which no symbol is transmitted (for the given tone).

Figure 6C:
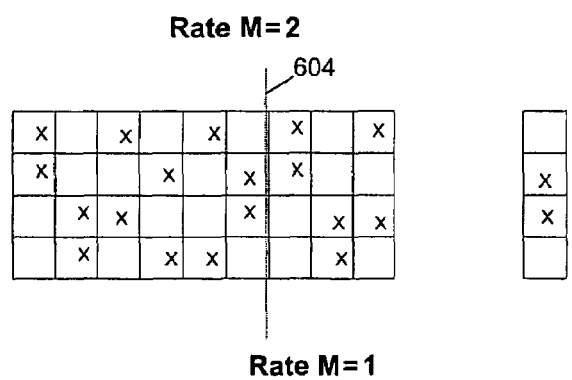

For a spatial multiplexing rate M=2, 2 symbols are mapped onto $M_T=4$ antennas at each OFDM tone, t. There are a total of $$\binom{4}{2} = \frac{4!}{2! \times (2)!} = 6$$

permutations possible. The mappings may be chosen in an cyclical fashion as follows, as shown in FIG. 6C for M=2:

For tone 1 (t=1):

$$C(1) = \begin{pmatrix} s_1(1) \\ s_2(1) \\ 0 \\ 0 \end{pmatrix}$$

For tone 2 (t=2):

$$C(2) = \begin{pmatrix} 0 \\ 0 \\ s_3(2) \\ s_4(2) \end{pmatrix}$$

For tone 3 (t=3):

$$C(3) = \begin{pmatrix} s_1(3) \\ 0 \\ s_3(3) \\ 0 \end{pmatrix}$$

For tone 4 (t=4):

$$C(4) = \begin{pmatrix} 0 \\ s_2(4) \\ 0 \\ s_4(4) \end{pmatrix}$$

For tone 5 (t=5):

$$C(5) = \begin{pmatrix} s_1(5) \\ 0 \\ 0 \\ s_4(5) \end{pmatrix}$$

For tone 6 (t=6):

$$C(6) = \begin{pmatrix} 0 \\ s_2(6) \\ s_3(6) \\ 0 \end{pmatrix}$$

and so on for higher tone numbers, in a cyclical fashion.

The receiver implementations are similar to that given above for the M=4 case. The only difference is that the 2 $M_R \times 1$ column vectors, $h_j(t)$ and $h_{k \neq k}(t)$, are set to zero. The columns "j" and "k" correspond to the antennas on which no symbol is transmitted (for the given tone).

Figure 6D:
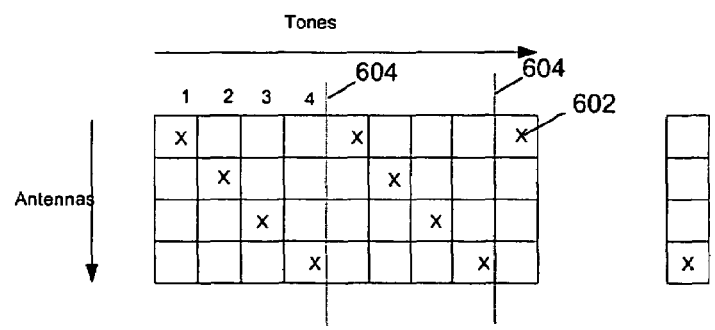
Figure 7A:
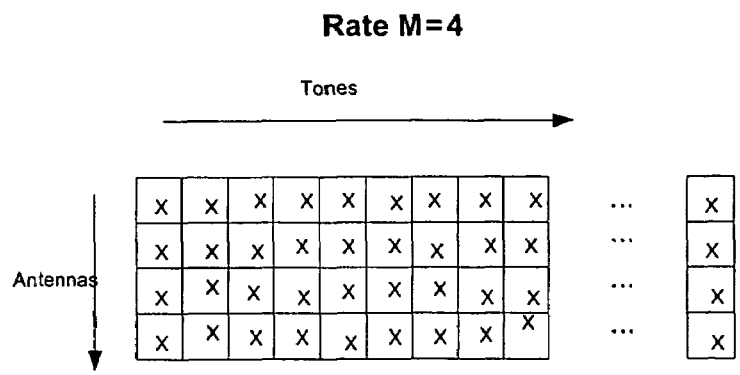
FIGS. 7A-7D are plots showing antenna mappings for different spatial multiplexing rates according to another embodiment.
Figure 7B:
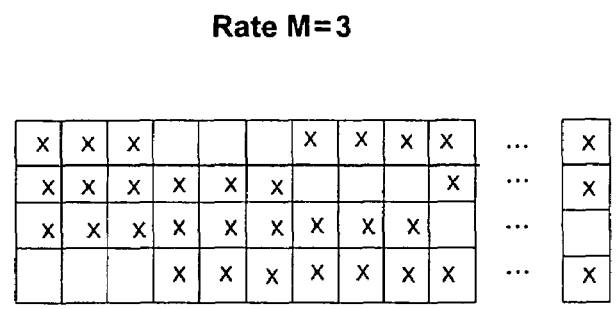
Figure 7C:
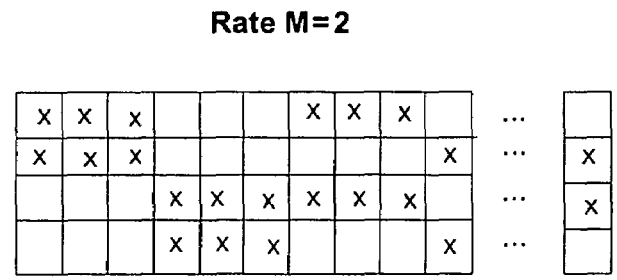
Figure 7D:
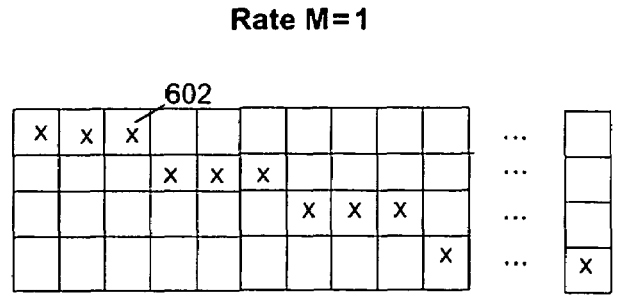

For a spatial multiplexing rate M=1, 1 symbol is mapped onto $M_T$=4 antennas at each OFDM tone, t, as shown in FIG. 6D for M=1. In the 4×4 MIMO system, a spatial multiplexing rate M=1 indicates pure diversity. There are a total of $$\binom{4}{1} = \frac{4!}{1! \times (3)!} = 4$$

permutations possible. The mappings may be chosen in an cyclical fashion as follows:

For tone 1 (t=1):

$$C(1) = \begin{pmatrix} s_1(1) \\ 0 \\ 0 \\ 0 \end{pmatrix}$$

For tone 2 (t=2):

$$C(2) = \begin{pmatrix} 0 \\ s_2(2) \\ 0 \\ 0 \end{pmatrix}$$

For tone 3 (t=3):

$$C(3) = \begin{pmatrix} 0 \\ 0 \\ s_3(3) \\ 0 \end{pmatrix}$$

For tone 4 (t=4):

$$C(4) = \begin{pmatrix} 0 \\ 0 \\ 0 \\ s_4(4) \end{pmatrix}$$

and so on for higher tone numbers, in a cyclical fashion.

One receiver implementation is the well-known linear-MRC receiver, which is also the ML receiver. This is given as:

$$\hat{s}_k(t) = \frac{h_k^*(t)}{\|h_k^*(t)\|^2} y(t)$$

where the column "k" corresponds to the antenna on which the symbol is transmitted on a given tone.

An advantage of the space-frequency coding (or mapping) scheme described above is that it converts the available spatially selective channel to a frequency selective channel. The outer-convolutional code (and interleaving) can hence achieve superior performance due to increased frequency selectivity. Also, not all tones are used for each transmit antenna.

Another possible advantage of the space-frequency coding technique is that the permutations ensure that equal or similar power is transmitted on all antennas regardless of the spatial multiplexing rate (M). This may make the power amplifier design requirement less stringent compared to coding techniques that transmit different power on different antennas. In other words, this scheme requires a power amplifier with lower peak power, which may provide cost savings. The space frequency coding technique also ensures that all transmit antennas are used regardless of the spatial multiplexing rate. Consequently, maximum spatial diversity is captured at all times. This condition also facilitates the receiver automatic gain control (AGC) implementation, since the power is held constant across the whole length of the packet. This is in contrast to systems with antenna selection, in which case some antennas may not be selected as a result of which the receiver power can fluctuate from symbol to symbol, complicating AGC design.

Another advantage of the space-frequency coding technique is that such a system can incorporate MIMO technology into legacy systems (e.g., IEEE 802.11a/g systems), while maintaining full-backward compatibility with legacy receivers in the rate 1 mode (M=1, or pure diversity). In this mode, with each transmitter transmitting 1/M of the total power, the legacy receivers cannot tell that the data is indeed being transmitted from multiple transmit antennas. Hence, no additional overhead is required to support legacy systems. The rate M=1 can be used in legacy (11a,11g) systems.

Another advantage is that the above space-frequency coding scheme does not use all tone-antenna combinations. This lowers the amount of training required since channels corresponding to only a subset of tone-antenna combinations need to be trained. This may improve throughput by simplifying preamble design.

One of the main problems in OFDM systems is Intercarrier interference (ICI) due to phase noise, and frequency offset It is well known that the ICI effects are more severe in frequency selective channels. In an embodiment, a new permutation is chosen after several tones instead of after each tone, as shown in FIGS. 7A-7D. This reduces the number of "hops" across the tones, which in turn reduces frequency selectivity and hence ICI, leading to improved performance.

In the embodiments described above, the permutations can be viewed as multiplying the symbols transmitted on each antenna for a given tone by unity or zero. For the M=2 case given above, the permutation for tone 1 is given by:

$$C(1) = \begin{pmatrix} s_1(1) \\ s_2(1) \\ s_3(1) \\ s_4(1) \end{pmatrix} \times \begin{pmatrix} 1 \\ 1 \\ 0 \\ 0 \end{pmatrix} = \begin{pmatrix} s_1(1) \\ s_2(1) \\ 0 \\ 0 \end{pmatrix}.$$

However, in alternative embodiments, the symbols may be multiplied by other (possibly complex) scalars to produce the permutations.

The space-frequency coding techniques described may be implemented in many different wireless systems, e.g., systems compliant with IEEE standards 802.11a, 802.11g, 802.16, and 802.20.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A method comprising:
receiving a selected spatial multiplexing rate, the spatial multiplexing rate corresponding to a number of data streams for transmission on a like number of antennas; and
for a plurality of data tones, applying a plurality of mappings in an alternating manner to map one or more of a plurality of data symbols to the antennas, wherein the plurality of mappings include up to $$\binom{M_T}{M} = \frac{M_T!}{M! \times (M_T - M)!}$$

number of mappings, wherein M is the spatial multiplexing rate and $M_T$ is the number of antennas.

2. The method of claim 1, wherein the plurality of data tones comprise data tones in an OFDM (Orthogonal Frequency Division Multiplexing) symbol.

3. The method of claim 2, wherein said applying comprises space frequency coding the OFDM symbol.

4. The method of claim 3, further comprising:
transmitting the coded OFDM symbol on the antennas.

5. The method of claim 1, wherein the spatial multiplexing rate is selected from a plurality of available spatial multiplexing rates corresponding to the number of antennas.

6. The method of claim 5, wherein the plurality of available spatial multiplexing rates comprise a pure diversity spatial multiplexing rate, a pure multiplexing spatial multiplexing rate, and one or more intermediate spatial multiplexing rates.

7. The method of claim 1, wherein the mappings are applied to the plurality of data tones in a cyclical manner.

8. The method of claim 1, wherein said applying comprising mapping with an apparatus compliant with a standard selected from the group consisting of IEEE standards 802.11a, 802.11g, 802.16, and 802.20.

9. The method of claim 1, wherein said applying provides substantially maximum spatial diversity for the selected spatial multiplexing rate.

10. The method of claim 1, further comprising:
transmitting the plurality of data symbols from the antennas at a substantially equal power for each antenna.

11. The method of claim 1, wherein said applying comprises mapping said one or more of the plurality of data symbols to the antennas for each of the plurality of data tones using less than a plurality of available tone-antenna combinations.

12. The method of claim 1, wherein said applying comprises mapping a same mapping to the antennas for a plurality of adjacent tones.

13. A method comprising:
receiving a space frequency coded symbol from a plurality of antennas, the space frequency coded symbol including a plurality of data tones,
wherein the plurality of data tones includes one or more of a plurality of data symbols mapped according to a plurality of mappings applied in an alternating manner, the plurality of mappings including up to $$\binom{M_T}{M} = \frac{M_T!}{M! \times (M_T - M)!}$$

number of mappings, wherein M is a selected spatial multiplexing rate and $M_T$ is a number of the plurality of antennas, and
wherein the spatial multiplexing rate corresponds to a number of data streams used for transmission on a like number of antennas; and
decoding the space frequency coded symbol.

14. The method of claim 13, wherein said decoding comprises decoding using a linear decoding process.

15. The method of claim 13, wherein said decoding comprises decoding using a non-linear decoding process.

16. The method of claim 13, wherein the space frequency coded symbol comprises a space frequency coded OFDM symbol.

17. The method of claim 13, wherein the spatial multiplexing rate is selected from a plurality of spatial multiplexing rates corresponding to the number of antennas.

18. The method of claim 17, wherein the plurality of spatial multiplexing rates comprise a pure diversity spatial multiplexing rate, a pure multiplexing spatial multiplexing rate, and one or more intermediate spatial multiplexing rates.

19. The method of claim 13, wherein the mappings are applied to the plurality of data tones in a cyclical manner.

20. The method of claim 13, wherein said receiving comprises receiving with an apparatus compliant with a standard selected from the group consisting of IEEE standards 802.11a, 802.11g, 802.16, and 802.20.

21. The method of claim 13, wherein said receiving comprises receiving the space frequency coded symbol with substantially maximum spatial diversity on the plurality of antennas for the selected spatial multiplexing rate.

22. The method of claim 13, wherein said receiving comprises receiving the space frequency coded symbol at a substantially equal power for each antenna.

23. The method of claim 13, wherein the space frequency coded symbol includes a plurality of data symbols mapped according to the mappings applied in an alternating manner for a plurality of adjacent tones.

24. An apparatus comprising:
- a demultiplexer operative to demultiplex a plurality of data symbols in an input stream;
- a mode selector operative to select a spatial multiplexing rate from a plurality of available spatial multiplexing rates, the selected spatial multiplexing rate corresponding to a number of data streams for transmission on a like number of antennas; and
- a coding module operative to space frequency code a symbol for transmission, the coding comprising, for a plurality of data tones, applying a plurality of mappings in an alternating manner to map one or more of the plurality of data symbols to the antennas;
- wherein the plurality of mappings include up to $$\binom{M_T}{M} = \frac{M_T!}{M! \times (M_T - M)!}$$

number of mappings, wherein M is the spatial multiplexing rate and $M_T$ is the number of antennas.

25. The apparatus of claim 24, wherein the symbol for transmission comprises an OFDM symbol.

26. The apparatus of claim 25, further comprising:
- a transmission module operative to transmit the coded OFDM symbol on the antennas.

27. The apparatus of claim 24, wherein the plurality of available spatial multiplexing rates comprise a pure diversity spatial multiplexing rate, a pure multiplexing spatial multiplexing rate, and one or more intermediate spatial multiplexing rates.

28. The apparatus of claim 24, wherein the coding module is operative to apply the mappings to the plurality of data tones in a cyclical manner.

29. The apparatus of claim 24, which is compliant with a standard selected from the group consisting of IEEE standards 802.11a, 802.11g, 802.16, and 802.20.

30. The apparatus of claim 24, wherein the coding module is operative to space frequency code the symbol to provide substantially maximum spatial diversity for the selected spatial multiplexing rate.

31. The apparatus of claim 24, further comprising:
- a transmit module operative to transmit the symbol from the antennas at a substantially equal power for each antenna.

32. The apparatus of claim 24, wherein the coding module is operative to code the symbol using less than a plurality of available tone-antenna combinations.

33. The apparatus of claim 24, wherein the coding module is operative to map one or more of the plurality of data symbols to antennas using a same mapping for a plurality of adjacent tones.

34. An apparatus comprising:
- a receiver operative to receive a space frequency coded symbol from a plurality of antennas, the space frequency coded symbol including a plurality of data tones,
- wherein the plurality of data tones includes one or more of a plurality of data symbols mapped according to a plurality of mappings applied in an alternating manner, and wherein the plurality of mappings include up to $$\binom{M_T}{M} = \frac{M_T!}{M! \times (M_T - M)!}$$

number of mappings, wherein M is a selected spatial multiplexing rate and $M_T$ is a number of the plurality of antennas, wherein the spatial multiplexing rate corresponds to a number of data streams transmitted from a like number of antennas; and
- a decoder operative to decode the space frequency coded symbol.

35. The apparatus of claim 34, wherein the decoder comprises a linear decoder.

36. The apparatus of claim 34, wherein the decoder comprises a non-linear decoder.

37. The apparatus of claim 34, wherein the space frequency coded symbol comprises a space frequency coded OFDM symbol.

38. The apparatus of claim 34, wherein the spatial multiplexing rate is selected from a plurality of spatial multiplexing rates corresponding to the number of the plurality of antennas.

39. The apparatus of claim 38, wherein the plurality of spatial multiplexing rates comprise a pure diversity spatial multiplexing rate, a pure multiplexing spatial multiplexing rate, and one or more intermediate spatial multiplexing rates.

40. The apparatus of claim 34, wherein the mappings are applied to the plurality of data tones in a cyclical manner.

41. The apparatus of claim 34, which is compliant with a standard selected from the group consisting of IEEE standards 802.11a, 802.11g, 802.16, and 802.20.

42. The apparatus of claim 34, wherein the space frequency coded symbols is coded using less than a plurality of available tone-antenna combinations.

43. The apparatus of claim 34, wherein the space frequency coded symbol includes one or more of the plurality of data symbols mapped to the plurality of antennas using a same mapping for a plurality of adjacent tones.

44. An apparatus comprising:
- means for demultiplexing a plurality of data symbols in an input stream;
- means for selecting a spatial multiplexing rate from a plurality of available spatial multiplexing rates, the selected spatial multiplexing rate corresponding to a number of data streams for transmission on a like number of antennas; and
- means for space frequency coding a symbol for transmission, the coding comprising, for a plurality of data tones, applying a plurality of mappings in an alternating manner to map one or more of a plurality of data symbols to the antennas;
- wherein the plurality of mappings include up to $$\binom{M_T}{M} = \frac{M_T!}{M! \times (M_T - M)!}$$

number of mappings, wherein M is the selected spatial multiplexing rate and $M_T$ is the number of antennas.

45. The apparatus of claim 44, wherein the symbol for transmission comprises an OFDM symbol.

46. The apparatus of claim 45, further comprising:
- means for transmitting the coded OFDM symbol on the antennas.

47. The apparatus of claim 44, wherein the plurality of available spatial multiplexing rates comprise a pure diversity spatial multiplexing rate, a pure multiplexing spatial multiplexing rate, and one or more intermediate spatial multiplexing rates.

48. The apparatus of claim 44, wherein the means for space frequency coding is operative to apply the mappings to the plurality of data tones in a cyclical manner.

49. The apparatus of claim 44, which is compliant with a standard selected from the group consisting of IEEE standards 802.11a, 802.11g, 802.16, and 802.20.

50. The apparatus of claim 44, further comprising means for space frequency coding the symbol to provide substantially maximum spatial diversity for the selected spatial multiplexing rate.

51. The apparatus of claim 44, further comprising:
means for transmitting the symbol from the antennas at a substantially equal power for each antenna.

52. The apparatus of claim 44, further comprising means for space frequency coding the symbol using less than a plurality of available tone-antenna combinations.

53. The apparatus of claim 44, further comprising means for mapping one or more of the plurality of data symbols to the antennas using a same mapping for a plurality of adjacent tones.

54. An apparatus comprising:
means for receiving a space frequency coded symbol from a plurality of antennas, the space frequency coded symbol including a plurality of data tones,
wherein the plurality of data tones includes one or more of a plurality of data symbols mapped according to a plurality of mappings applied in an alternating manner, the plurality of mappings including up to $$\binom{M_T}{M} = \frac{M_T!}{M! \times (M_T - M)!}$$

number of mappings, wherein M is a selected spatial multiplexing rate and $M_T$ is a number of the plurality of antennas, and wherein the spatial multiplexing rate corresponds to a number of data streams used for transmission on a like number of antennas; and means for decoding the space frequency coded symbol.

55. The apparatus of claim 54, wherein said means for decoding comprises a means for decoding using a linear decoding technique.

56. The apparatus of claim 54, wherein said means for decoding comprises a means for decoding using a non-linear decoding technique.

57. The apparatus of claim 54, wherein the space frequency coded symbol comprises a space frequency coded OFDM symbol.

58. The apparatus of claim 54, wherein the spatial multiplexing rate is selected from a plurality of spatial multiplexing rates corresponding to the number of the antennas.

59. The apparatus of claim 58, wherein the plurality of spatial multiplexing rates comprise a pure diversity spatial multiplexing rate, a pure multiplexing spatial multiplexing rate, and one or more intermediate spatial multiplexing rates.

60. The apparatus of claim 54, wherein the mappings are applied to the plurality of data tones in a cyclical manner.

61. The apparatus of claim 54, which is compliant with a standard selected from the group consisting of IEEE standards 802.11a, 802.11g, 802.16, and 802.20.

62. The apparatus of claim 54, wherein the space frequency coded symbol is coded using less than a plurality of available tone-antenna combinations.

63. The apparatus of claim 54, wherein the space frequency coded symbol includes one or more of the plurality of data symbols mapped to the plurality of antennas using a same mapping for a plurality of adjacent tones.

* * * * *